June 6, 1950 — L. J. CUNEO — 2,510,080
OPTICAL PROJECTION SYSTEM
Filed March 18, 1946 — 2 Sheets-Sheet 1

Inventor
Lawrence J. Cuneo
By M. Hayes
Attorney

June 6, 1950 L. J. CUNEO 2,510,080
OPTICAL PROJECTION SYSTEM
Filed March 18, 1946 2 Sheets-Sheet 2
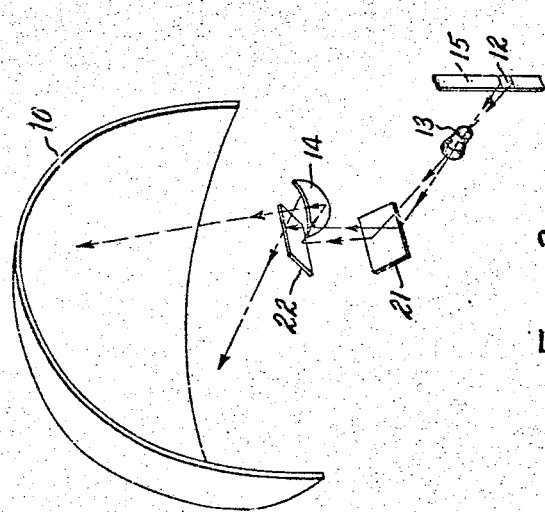
Fig. 3
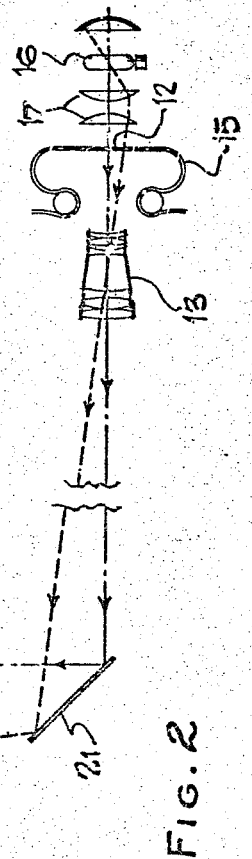
Fig. 2
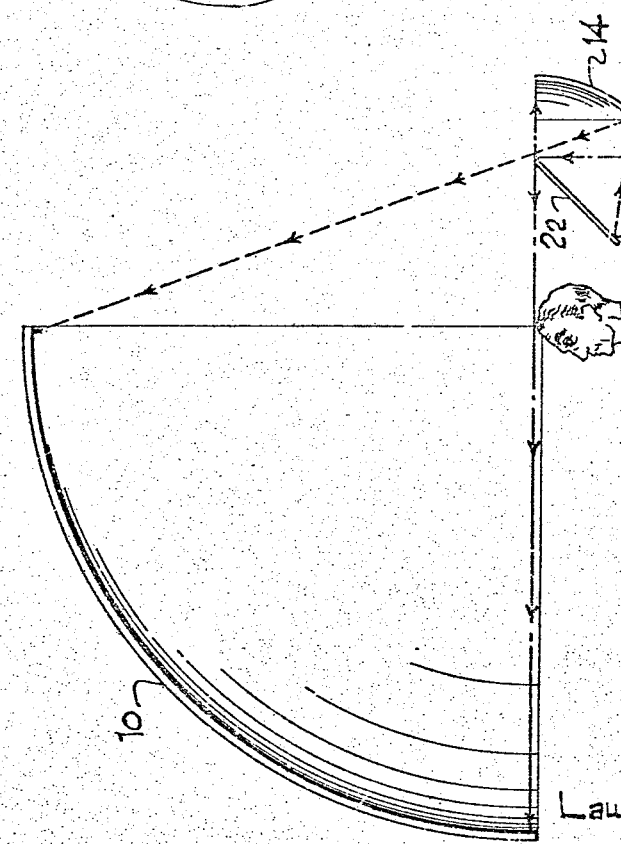
Inventor
Lawrence J. Cuneo
By M. Hayes
Attorney Patented June 6, 1950

2,510,080

UNITED STATES PATENT OFFICE 2,510,080

OPTICAL PROJECTION SYSTEM

Lawrence J. Cuneo, United States Navy

Application March 18, 1946, Serial No. 655,361

4 Claims. (Cl. 88—24)

(Granted under the act of March 3, 1883, as amended April 30, 1928; 370 O. G. 757)

The present invention relates to optical systems, and particularly to an improved lens system having an extremely wide field of view without sacrifice of quality of definition or of lens speed. In the form of the invention shown in the drawings, the principles of the invention are illustrated in a preferred form for use as a projection system, and the arrangement disclosed permits projection of a sharp, brilliant motion-picture image on an extremely wide-angle screen.

Projection systems of this general type can be utilized for various purposes, but are particularly suitable for use in synthetic anti-aircraft or aerial gunnery trainers, so that a student can be given rapid and effective instruction in the elements of gunnery by training a mock-up weapon on moving-picture images of attacking planes. Naturally, since a crew handling a real gun can expect to repel an attack from almost any direction, it is of great advantage to be able to utilize an unusually wide field of view, so that the student will learn to handle his weapons effectively against any possible type of attack. At the same time, the quality of definition of the lens system must be good enough so that tiny images of distant planes can be recognized as friendly or enemy types, and the illumination of the screen should be sufficient to permit use of photoelectric scoring devices as well as to provide satisfactory illumination for sighting the synthetic weapons of the trainer.

It is the object of this invention to provide a wide-angle optical system meeting these requirements and adapted for use in any application requiring a relatively fast lens system capable of good definition throughout a wide field of view.

As shown, the system is arranged to project an image from a single motion-picture film to a quadrant of a spherical dome, so that the field of view extends through 180 degrees in azimuth and 90 degrees in elevation. The result is accomplished by the novel combination of a projection lens having a definite curvature of field, together with a mirror having a field of equal and opposite curvature so that they will compensate for each other and permit sharp focus at all points on the screen. If desired, the lens and mirror combination can be augmented by the provision of mirrors so that none of the projection equipment need be positioned in the center of the spherical screen. This feature is not essential to the practice of the invention, but affords further advantages in that it permits an observer or student to man a gun turret or other mock-up weapon at the exact geometric center of the screen.

In the drawings:

Fig. 2 is a similar view of a modification of the system shown in Fig. 1, to permit an observer to view the screen from its exact center.

Fig. 3 is a perspective illustration of the system shown in Fig. 2.

Figure 1:
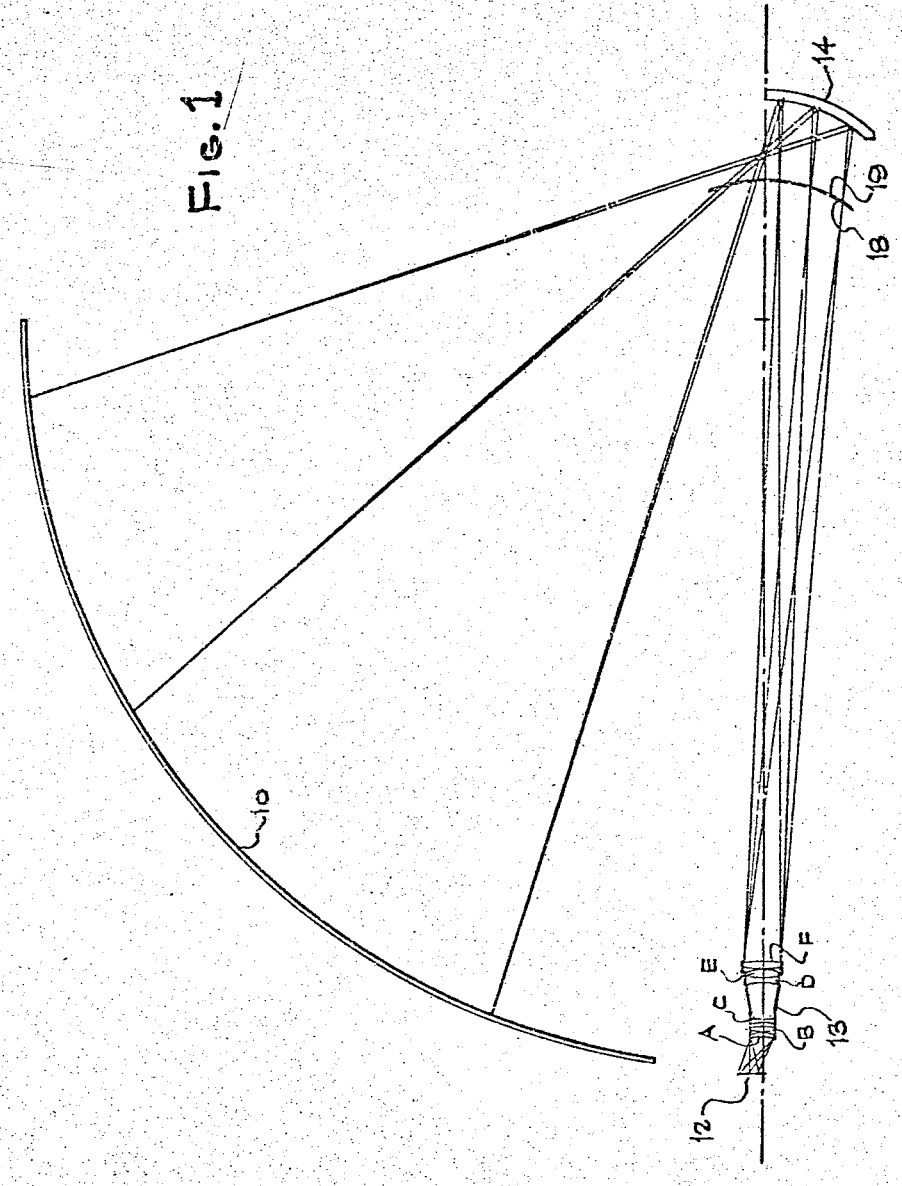
Fig. 1 is a diagrammatic illustration of an optical system in accordance with the teachings of this disclosure.

The screen 10 is shown as of semi-spherical shape, comprising a quadrant of a complete sphere, but it need not necessarily be exactly spherical in shape, and reasonably good results can be obtained by projecting an image on any three-dimensional screen, such as the interior walls of any ordinary room. The image is projected from a point 12 through a lens system generally indicated at 13 to a concave spherical mirror 14 and thence to the screen 10. Obviously, the image will normally be projected from a motion-picture projector having a film 15, a source of illumination 16 and condensing lenses 17. (See Figure 2.)

This image projected through the lens system 13 is characterized by a definite positive curvature of field. For this purpose the "Petzval portrait" type of lens is ideally suited.

The function of the lens system 13 is to focus an image in a positively curved field 18, Fig. 1, which generally corresponds in shape and location to the negatively curved field of focus 19 of the concave spherical mirror 14, so that the overall Petzval curvature becomes zero. This combination gives a high quality of image over the entire field and yet permits a lens speed up to F/2 with the arrangement shown.

It follows that the best results are obtained when the lens and mirror are exactly matched and while the present application makes no claim to the lens per se, both the lens system and mirror are shown and described to permit a thorough appreciation and understanding of the general optical system.

The lens system 13 consists of six separate elements, designated as A to F inclusive. The specifications of the lens elements and the mirror are as follows:

| Element | Glass and Index of Refraction | Radius | Thickness and Separation |
|---|---|---|---|
| A | Dense Barium Crown. Sodium 1.61100—new 58.8 | −3.884 −1.765 | 0.237 0.007 |
| B | Same | +3.633 −5.138 | 0.236 0.158 |
| C | Extra Dense Flint. Sodium 1.64900 new 33.8 | −2.252 +24.37 | 0.105 1.891 |
| D | Same | −4.989 +4.499 | 0.135 0.000 |
| E | Boro Silicate Crown. 1.51700 new 64.5 | +4.499 −2.295 | 0.503 0.007 |
| F | Barium Flint. 1.60530 new 43.6 | +13.44 −10.16 | 0.285 ¹ 55.35 |
| 14 | Front Surfaced Mirror | −9.265 | ² 144 |

¹ To mirror.
² To screen.

It may be of advantage for the observer or student to be located at the geometric center of the screen. This can be accomplished without interference with the projection system by the arrangement shown in Figures 2 and 3. Here a reflector system is provided, which comprises a pair of plane mirrors 21 and 22 to redirect the light projected from the lens 13 to the reflector 14, the reflector 14 comprising an objective mirror of the reflector system. The several mirrors 21, 22 and 14 of the reflector system are so oriented with reference to the lens system 13 and screen 10 that rays do not cross the center of the screen 10 which is occupied by the observer. Thus the observer may be positioned at the most desirable point without interfering with the functioning of the system.

The present invention permits projection of images on an unusually wide field of view and eliminates the necessity for resorting to batteries of synchronized projectors or other elaborate and expensive installations to accomplish satisfactory image projection on a large three-dimensional screen. The system also possesses marked advantages by reason of the fact that the rays reaching the screen are almost parallel, giving a great depth of focus. Moreover, these results are accomplished without the use of delicate or cumbersome equipment, and the system is of such inherently simple design as to be readily adapted to other types of apparatus requiring wide-angle projectors or cameras.

The above described apparatus is subject to numerous modifications and variations and therefore I wish to be limited only by the scope of the invention as defined in the appended claims.

The invention, if patented, may be manufactured and used by or for the Government for governmental purposes without the payment to me of any royalty thereon.

Having thus described the invention, what I claim as new and desire to secure by Letters Patent is:

1. In a wide-angle projection system, the combination, with a motion-picture film, of a light source and system of condensing lenses; a projection lens of the Petzval portrait type having a positively curved field of focus; a concave spherical mirror positioned with its field of focus substantially coincident with the field of the projection lens, a three-dimensional screen, and at least one mirror to reflect light rays from the projection lens to the spherical mirror without passing said rays through the geometric center point of the screen.

2. In an optical projection system, the combination comprising a motion-picture projector including a lens, a three-dimensional concave screen, an observation position located with reference to the screen for viewing respectively different portions of its area by turning to look in different directions, a reflector having a field of focus that corresponds with the field of focus of the projector lens, the reflector being positioned with its field of focus located coincident with the field of focus of the projector lens, the reflector being also positioned to reflect an image from the projector onto the screen distributed over the area thereof.

3. In an optical system as defined in claim 2, the projector lens being a Petzval portrait type.

4. In an optical projection system, the combination comprising a motion-picture projector having a lens, a three-dimensional concave screen, an observation position located with reference to the screen for viewing respectively different positions of its area by turning to look in different directions, a reflector system positioned to reflect images from the projector to the screen distributed over the area thereof, the path of the reflection being away from the observation position, the reflector system including a mirror with a field of focus corresponding with the field of focus of the projector lens and located coincident therewith.

LAWRENCE J. CUNEO.

REFERENCES CITED

The following references are of record in the file of this patent:

UNITED STATES PATENTS

| Number | Name | Date |
|---|---|---|
| 545,422 | Chase | Aug. 27, 1895 |
| 1,412,997 | Bonneau et al. | Apr. 18, 1922 |
| 1,419,901 | Lehnhoff et al. | June 13, 1922 |
| 1,551,259 | Merriman | Aug. 25, 1925 |
| 1,797,202 | Warmisham | Mar. 17, 1931 |
| 1,831,939 | White | Nov. 17, 1931 |
| 1,919,561 | Kogel | July 25, 1933 |
| 2,039,878 | Boykow | May 5, 1936 |
| 2,045,120 | Carpenter | June 23, 1936 |
| 2,074,991 | Salcedo | Mar. 23, 1937 |
| 2,084,795 | Donle | June 22, 1937 |
| 2,146,905 | McLeod et al. | Feb. 14, 1939 |
| 2,174,778 | Croft | Oct. 3, 1939 |
| 2,211,218 | Serrurier | Aug. 13, 1940 |
| 2,218,512 | Fetter | Oct. 1, 1940 |
| 2,306,679 | Warmisham | Dec. 29, 1942 |

FOREIGN PATENTS

| Number | Country | Date |
|---|---|---|
| 322,507 | Germany | July 1, 1920 |